United States Patent
Tang et al.

(10) Patent No.: US 11,936,083 B2
(45) Date of Patent: Mar. 19, 2024

(54) PHASE SHIFTER USABLE WITH AN ANTENNA INCLUDING FIRST AND SECOND SUBSTRATES HAVING ELECTRODE LAYERS FORMED THEREON, WHERE THE ELECTRODE LAYERS INCLUDE BODY AND BRANCH STRUCTURES

(71) Applicants: Beijing BOE Sensor Technology Co., Ltd., Beijing (CN); BOE Technology Group Co., Ltd., Beijing (CN)

(72) Inventors: Cuiwei Tang, Beijing (CN); Jie Wu, Beijing (CN); Tienlun Ting, Beijing (CN); Ying Wang, Beijing (CN); Haocheng Jia, Beijing (CN); Liang Li, Beijing (CN); Qiangqiang Li, Beijing (CN); Chuncheng Che, Beijing (CN)

(73) Assignees: Beijing BOE Sensor Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 413 days.

(21) Appl. No.: 17/290,399

(22) PCT Filed: Aug. 21, 2020

(86) PCT No.: PCT/CN2020/110420
§ 371 (c)(1),
(2) Date: Apr. 30, 2021

(87) PCT Pub. No.: WO2021/036921
PCT Pub. Date: Mar. 4, 2021

(65) Prior Publication Data
US 2022/0006188 A1    Jan. 6, 2022

(30) Foreign Application Priority Data
Aug. 29, 2019    (CN) .......................... 201910808959.0

(51) Int. Cl.
*H01P 1/18* (2006.01)
*G02F 1/13* (2006.01)
(Continued)

(52) U.S. Cl.
CPC ............ *H01P 1/181* (2013.01); *G02F 1/1313* (2013.01); *H01P 1/184* (2013.01); *H01Q 1/38* (2013.01); *H01Q 1/50* (2013.01); *H01Q 3/36* (2013.01)

(58) Field of Classification Search
CPC .................................. H01P 1/181; H01Q 3/36
(Continued)

(56) References Cited

U.S. PATENT DOCUMENTS

| 11,119,364 | B2* | 9/2021 | Li et al. ................ H01P 1/184 |
| 2009/0174499 | A1 | 7/2009 | Hiramatsu et al. |
| 2020/0203827 | A1* | 6/2020 | Wang et al. ............ H01P 1/181 |

FOREIGN PATENT DOCUMENTS

| CN | 105308789 A | 2/2016 |
| CN | 107394318 A | 11/2017 |

(Continued)

OTHER PUBLICATIONS

First Office Action dated May 31, 2021 for application No. CN201910808959.0 with English translation attached.

*Primary Examiner* — Benny T Lee
(74) *Attorney, Agent, or Firm* — Nath, Goldberg & Meyer; Joshua B. Goldberg

(57) ABSTRACT

There is provided a phase shifter including a first substrate, a second substrate and a dielectric layer between the first substrate and the second substrate, the first substrate includes a first base and a first electrode layer on a side, of the first base, the second substrate includes a second base, a second electrode layer and a reference voltage leading-in end on a side of the second base, the reference voltage (Continued)

leading-in end is coupled to the second electrode layer, one of the first electrode layer and the second electrode layer includes a body structure and branch structures; an orthographic projection of an end of each branch structure away from the body structure on the first base is overlapped with an orthographic projection of the second electrode layer or the first electrode layer on the first base. An antenna is further provided.

13 Claims, 7 Drawing Sheets

(51) Int. Cl.
*H01Q 1/38* (2006.01)
*H01Q 1/50* (2006.01)
*H01Q 3/36* (2006.01)

(58) Field of Classification Search
USPC .......................................................... 333/161
See application file for complete search history.

(56) References Cited

FOREIGN PATENT DOCUMENTS

| | | |
|---|---|---|
| CN | 107453013 A | 12/2017 |
| CN | 108511858 A | 9/2018 |
| CN | 108563050 A | 9/2018 |
| CN | 208384288 U | 1/2019 |
| CN | 208654481 U | 3/2019 |
| EP | 1128459 A2 | 8/2001 |
| JP | 2007082046 A | 3/2007 |

\* cited by examiner

PHASE SHIFTER USABLE WITH AN ANTENNA INCLUDING FIRST AND SECOND SUBSTRATES HAVING ELECTRODE LAYERS FORMED THEREON, WHERE THE ELECTRODE LAYERS INCLUDE BODY AND BRANCH STRUCTURES

This is a National Phase Application filed under 35 U.S.C. 371 as a national stage of PCT/CN2020/110420. Filed Aug. 21, 2020, an application claiming benefit of Chinese Application No. 201910808959.0, the contents of each of which is hereby incorporated by reference in its entirety.

TECHNICAL FIELD

The present disclosure relates to the field of communication technology, and particularly relates to a phase shifter and an antenna.

BACKGROUND

In a liquid crystal phase shifter structure, a voltage difference loaded between two metal plates in different planes is adjusted to drive liquid crystal molecules to deflect, so that different liquid crystal material characteristics are obtained, and a capacitance value of a variable capacitor is correspondingly obtained. A ground electrode and a signal electrode of a coplanar waveguide (CPW) structure are in a same plane.

In a coplanar waveguide (CPW) liquid crystal phase shifter structure, a signal electrode of the CPW in a liquid crystal cell and a periodic capacitor patch, which are loaded in different planes, form an overlapping capacitor, a voltage difference is formed between the two planes, and in such structure, the capacitor patch needs to be coupled to the ground electrode on a side of the signal electrode to form a current loop. At present, a way of coupling the capacitor patch to the ground electrode is realized by adding metal balls (particles) with a thickness slightly greater than the thickness of the liquid crystal cell, but due to limitation of doping concentration and difficulty in accurately controlling of positions of the particles, conductive characteristics of a specific region realized by the particles is low in controllability.

SUMMARY OF THE INVENTION

An embodiment of the present disclosure provides a phase shifter including a first substrate and a second substrate disposed opposite to each other, and a dielectric layer between the first substrate and the second substrate, where,
the first substrate includes a first base and a first electrode layer arranged on a side of the first base proximal to the dielectric layer, the second substrate includes a second base, and a second electrode layer and a reference voltage leading-in end arranged on a side of the second base proximal to the dielectric layer, the reference voltage leading-in end is coupled to the second electrode layer,
one of the first electrode layer and the second electrode layer includes a body structure, and branch structures coupled to the body structure,
in response to that the first electrode layer includes the body structure and the branch structures, an orthographic projection of an end of each of the branch structures away from the body structure on the first base is overlapped with an orthographic projection of the second electrode layer on the first base, and
in response to that the second electrode layer includes the body structure and the branch structures, the orthographic projection of the end of each of the branch structures away from the body structure on the first base is overlapped with an orthographic projection of the first electrode layer on the first base.

In some implementations, the first electrode layer includes the body structure and the branch structures; the branch structures include first branch structures coupled to a first side of the body structure and second branch structures coupled to a second side of the body structure opposite the first side,
the second electrode layer includes a first reference electrode and a second reference electrode which are arranged at an interval, the reference voltage leading-in end is coupled to the first reference electrode and the second reference electrode,
an orthographic projection of the body structure of the first electrode layer on the first base is located between orthographic projections of the first reference electrode and the second reference electrode on the first base,
an orthogonal projection of the first reference electrode on the first base overlaps with an orthogonal projection of an end of each of the first branch structures away from the body structure on the first base, and
an orthographic projection of the second reference electrode on the first base overlaps with an orthographic projection of an end of each of the second branch structures away from the body structure on the first base.

In some implementations, the second electrode layer includes the body structure and the branch structures, the body structure includes a first body structure and a second body structure, and the branch structures include first branch structures and second branch structures,
the first branch structures are coupled to a side of the first body structure proximal to the second body structure,
the second branch structures are coupled to a side of the second body structure proximal to the first body structure,
the reference voltage leading-in end is coupled to the first body structure and the second body structure,
the orthographic projection of the first electrode layer on the first base is located between orthographic projections of the first body structure and the second body structure on the first base; and
the orthographic projection of the first electrode layer on the first base overlaps with an orthographic projection of an end of each of the first branch structures away from the first body structure on the first base, and overlaps with an orthographic projection of an end of each of the second branch structures away from the second body structure on the first base.

In some implementations, the first branch structures and the second branch structures are arranged in a one-to-one correspondence, and the first branch structure and the second branch structure which are correspondingly arranged are formed into an integrally formed structure.

In some implementations, the second electrode layer includes the body structure and the branch structures; the branch structures are coupled to a side of the body structure proximal to the first electrode layer, an orthographic projection of an end of each of the branch structures proximal to the first electrode layer on the first base is overlapped with the orthographic projection of the first electrode layer on the first base, and the reference voltage leading-in end is coupled to the body structure.

In some implementations, the first electrode layer includes the body structure and the branch structures, the branch structures include first branch structures coupled to a first side of the body structure and second branch structures coupled to a second side of the body structure opposite the first side, the second electrode layer includes a first reference electrode and a second reference electrode which are arranged at an interval, third branch structures coupled to a side of the first reference electrode proximal to the second reference electrode, and fourth branch structures coupled to a side of the second reference electrode proximal to the first reference electrode, the reference voltage leading-in end is coupled to the first reference electrode and the second reference electrode, an orthographic projection of the body structure on the first base is located between orthographic projections of the first reference electrode and the second reference electrode on the first base, the first branch structures and the third branch structures are arranged in a one-to-one correspondence manner, and orthographic projections of the first branch structure and the third branch structure on the first base are at least partially overlapped, and the second branch structures and the fourth branch structures are arranged in a one-to-one correspondence mode, and orthographic projections of the second branch structure and the fourth branch structure on the first base are at least partially overlapped.

In some implementations, the first electrode layer includes the body structure and the branch structures coupled to a side of the body structure proximal to the second electrode layer, the second electrode layer includes a reference electrode and branch structures coupled to a side of the reference electrode proximal to the first electrode layer, the branch structures of the first electrode layer and the branch structures of the second electrode layer are arranged in a one-to-one correspondence, and orthographic projections of the branch structure of the first electrode layer and the branch structure of the second electrode layer on the first base at least partially overlap, and the reference voltage leading-in end is coupled to the reference electrode.

In some implementations, the reference voltage leading-in end includes a ground signal leading-in end.

In some implementations, the reference voltage leading-in end is coupled to the second electrode layer through a signal connection line, the signal connection line and the reference voltage leading-in end are formed by a same material and in a same layer, or the signal connection line and the second electrode layer are formed by a same material and in a same layer.

In some implementations, the body structure and the branch structures are formed into an integrally formed structure.

In some implementations, the branch structures located on a same side of the body structure are arranged periodically.

In some implementations, the dielectric layer includes liquid crystal molecules.

An embodiment of the present disclosure further provides an antenna, which includes the phase shifter described above.

DETAIL DESCRIPTION OF THE INVENTION

Figure 1:
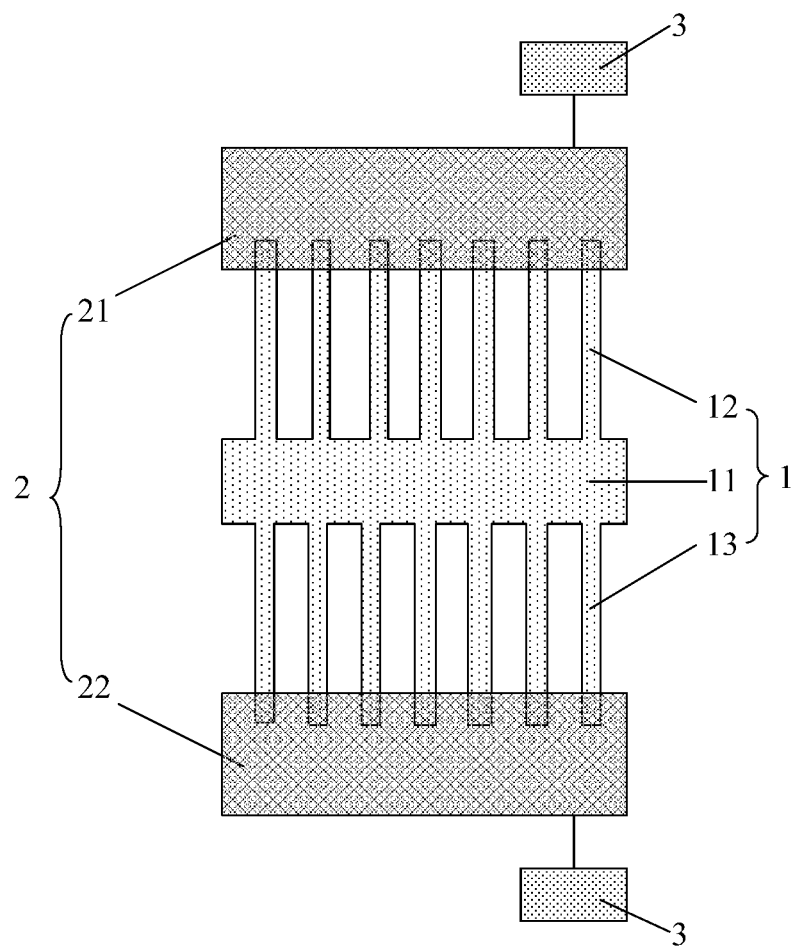
FIG. 1 is a top view of an implementation of a liquid crystal phase shifter according to an embodiment of the present disclosure.

In order to make technical solutions of the present disclosure better understood, the technical solutions of the present disclosure are described in further detail below with reference to the accompanying drawings and the detailed description, where like features are denoted by the same reference label.

Unless defined otherwise, technical or scientific terms used herein shall have the ordinary meaning as understood by one of ordinary skill in the art to which the present disclosure belongs. The use of "first", "second" and the like in the present disclosure is not intended to indicate any order, quantity, or importance, but rather is used to distinguish one element from another. Also, the use of the terms "a", "an" or "the" and similar referents do not denote a limitation of quantity, but rather denote the presence of at least one. The word "include" or "comprise", and the like, is intended to mean that the element or item preceding the word contains the element or item listed after the word and its equivalent, but not the exclusion of other elements or items. The terms "coupled" or "connected" and the like are not restricted to physical or mechanical connections, but may include electrical connections, whether direct or indirect. The positional relationship words "upper" and the like are used merely to indicate relative positional relationships, which may change accordingly when an absolute position of the object being described changes.

An embodiment of the present disclosure provides a phase shifter, and in particular, provides an improvement to a coplanar waveguide (CPW) type phase shifter. The phase shifter includes a first substrate, a second substrate and a dielectric layer, where the first substrate and the second substrate are oppositely arranged, and the dielectric layer is arranged between the first substrate and the second substrate and includes but is not limited to liquid crystal molecules. When the dielectric layer includes liquid crystal molecules, the phase shifter is a liquid crystal phase shifter, and the phase shifter according to the embodiment of the present disclosure is specifically described in following by taking it being the liquid crystal phase shifter as an example.

Specifically, in the phase shifter of the embodiment of the present disclosure, the first substrate includes a first base and a first electrode layer disposed on a side of the first base proximal to the dielectric layer, and the second substrate includes a second base and a second electrode layer disposed on a side of the second base proximal to the dielectric layer.

One of the first electrode layer and the second electrode layer includes a body structure and branch structures coupled to the body structure. When the first electrode layer includes the body structure and the branch structures, an orthographic projection of an end of each of the branch structures away from the body structure on the first base is overlapped with an orthographic projection of the second electrode layer on the first base; when the second electrode layer includes the body structure and the branch structures, the orthographic projection of the end of each of the branch structures away from the body structure on the first base is overlapped with an orthographic projection of the first electrode layer on the first base.

Particularly, a reference voltage leading-in end is arranged on a side, proximal to the dielectric layer, of the second base and is electrically coupled to the second electrode layer, so that the first electrode layer and the second electrode layer form a current loop when microwave signals are input to the first electrode layer.

It should be noted that, in the embodiment of the present disclosure, the first electrode layer is used for inputting a microwave signal, that is, the microwave signal is input through the first electrode layer, and the second electrode layer is used as a reference electrode. When the first electrode layer includes the body structure and the branch structures, the orthographic projection of each of the branch structures of the first electrode layer on the first base overlaps with the orthographic projection of the second electrode layer on the first base, and in such case, the second electrode layer serves as the reference electrode, while in the embodiment, the second electrode layer is directly coupled to a reference voltage leading-in end, and a reference voltage is applied to the second electrode layer through the reference voltage leading-in end, so that the body structure and the branch structures of the first electrode layer and the second electrode layer form a current loop. Compared with the related art in which the second electrode layer of the second substrate is coupled to the reference voltage leading-in end (i.e., a ground voltage leading-in end) of the first substrate through conductive metal particles, the liquid crystal phase shifter in the embodiment of the present disclosure has a simple structure and is highly integrated.

In some implementations, the second electrode layer may include the body structure and the branch structures, and the reference voltage leading-in end may be coupled to the body structure or the branch structures of the second electrode layer, so that the body structure and the branch structures of the second electrode layer and the first electrode layer form a current loop. The specific operation principle is similar to that described above, and thus, the detailed description thereof is not repeated herein.

In order to make the structure of the liquid crystal phase shifter in the embodiment of the present disclosure more clear, the following description will be given by taking the first electrode layer as a signal electrode, the second electrode layer as a reference electrode, and the reference voltage leading-in end and the second electrode layer being disposed in a same layer as an example.

Figure 2:
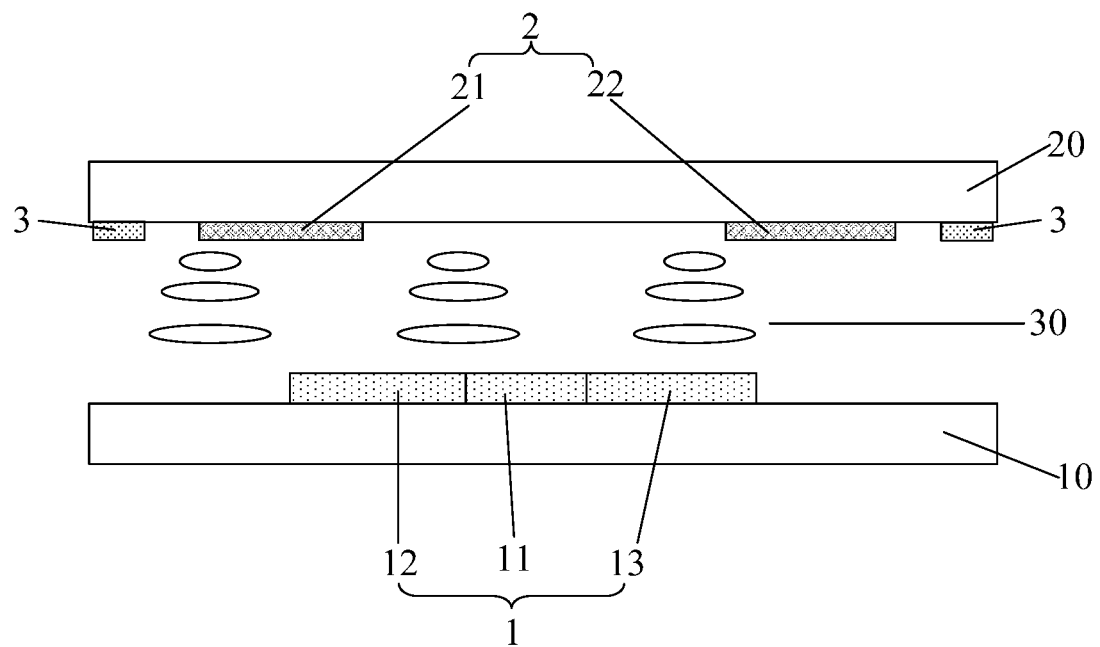
FIG. 2 is a cross-sectional view of the liquid crystal phase shifter shown in FIG. 1.

In some implementations, as shown in FIGS. 1 and 2, the liquid crystal phase shifter of the embodiment of the present disclosure includes a first substrate and a second substrate disposed opposite to each other, and a liquid crystal layer 30 (FIG. 2) disposed between the first substrate and the second substrate.

The first substrate may include a first base 10 (FIG. 2), a signal electrode 1 disposed on a side of the first base 10 proximal to the liquid crystal layer 30, the signal electrode 1 including a body structure 11 and branch structures, the branch structures including first branch structures 12 and second branch structures 13, the first branch structures 12 being coupled to a first side of the body structure 11, and the second branch structures 13 being coupled to a second side of the body structure 11 opposite to the first side.

The second substrate may include a second base 20 (FIG. 2), a reference electrode 2 and a reference voltage leading-in end 3 disposed on the second base 20 proximal to the liquid crystal layer 30, the reference electrode 2 includes a first reference electrode 21 and a second reference electrode 22 disposed at an interval, and an orthographic projection of the body structure 11 of the signal electrode 1 on the first base 10 is located between orthographic projections of the first reference electrode 21 and the second reference electrode 22 on the first base 10, and the orthographic projection of the first reference electrode 21 on the first base 10 overlaps with an orthographic projection of an end of each of the first branch structures 12 of the signal electrode 1 away from the body structure 11 on the first base 10; the orthographic projection of the second reference electrode 22 on the first base 10 overlaps with an orthographic projection of an end of each of the second branch structures 13 of the signal electrode 1 away from the body structure 11 on the first base 10.

It should be noted that the first reference electrode 21 and the second reference electrode 22 may be coupled to a same reference voltage leading-in end 3, or may be coupled to different reference voltage leading-in ends 3, it should be understood, whether the same reference voltage leading-in end 3 is coupled, or different reference voltage leads 3 are coupled, the reference voltage signals input by the first reference electrode 21 and the second reference electrode 22 are generally the same, and can make that a certain voltage difference exists between the signal electrode 1 and the reference electrode 2 (the first reference electrode 21 and the second reference electrode 22) when a microwave signal is input by the signal electrode 1, and a dielectric constant of the liquid crystal layer in a liquid crystal capacitor formed by the branch structures (the first branch structures 12 and the second branch structures 13) of the signal electrode 1 and the reference electrode 2 is changed so that a phase of the microwave signal is changed.

It should be noted that the first substrate is provided with a signal voltage leading-in end, which is coupled to the signal electrode 1 through a signal connection line for providing a signal voltage to the signal electrode 1, where the signal voltage has a voltage value different from that of the reference voltage.

In some implementations, the first branch structures 12 and the second branch structures 13 of the signal electrode 1 are arranged periodically. For example, the first branch structures 12 and the second branch structures 13 may be symmetrically disposed along the body structure, and a distance between any two adjacent first branch structures 12 may be the same, or may monotonically increase or monotonically decrease according to a certain rule. Similarly, a distance between any two adjacent second branch structures 13 may be the same, or may monotonically increase or decrease according to a certain rule. Thus, when a voltage is applied between the signal electrode 1 and the reference electrode 2 (the first reference electrode 21 and the second reference electrode 22), the dielectric constant of the liquid crystal layer 30 between the signal electrode 1 and the reference electrode 2 changes regularly, which facilitates a control of phase shift degree of the microwave signal input by the signal electrode 1. In some implementations, distances between adjacent first branch structures 12 may be different, and the first branch structures 12 may not be arranged according to a rule; overlapping areas between orthographic projections of the first branch structures 12 on the first base 10 and the orthographic projection of the first reference electrode 21 on the first base 10 may be different; similarly, distances between adjacent second branch structures 13 may be different, and the second branch structures 13 may not be arranged according to a rule; overlapping areas between orthographic projections of the second branch structures 12 on the first base 10 and the orthographic projection of the second reference electrode 21 on the first base 10 may be different.

Figure 3:
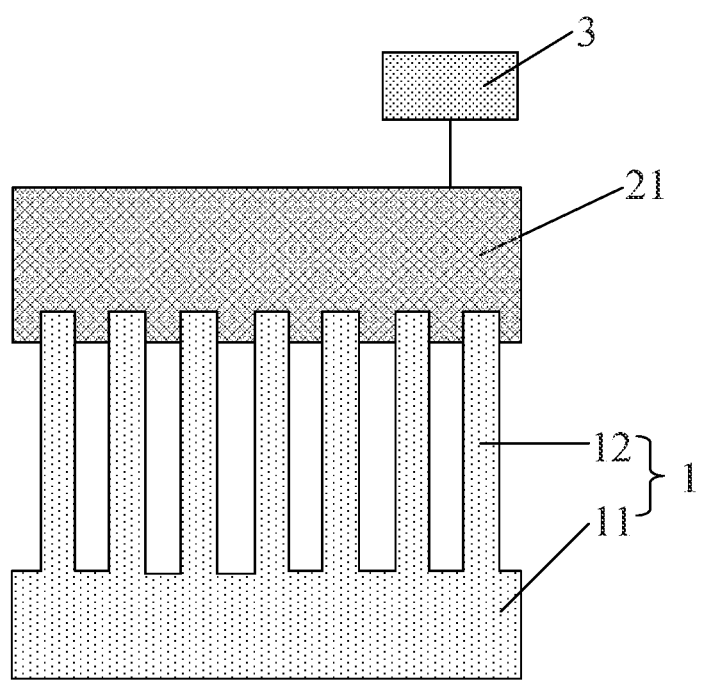
FIG. 3 is a top view of an implementation of a liquid crystal phase shifter according to an embodiment of the present disclosure.

It should be understood that, as shown in FIG. 3, the signal electrode 1 may include only one of the first branch structures 12 and the second branch structures 13 (not shown in FIG. 3), and the body structure 11; whereas, when the signal electrode 1 includes the first branch structures 12 and does not include the second branch structures 13, the reference electrode 2 (FIGS. 1 and 2) includes the first reference electrode 21 and does not include the second reference electrode 22 (not shown in FIG. 3). It should be understood that when the signal electrode 1 includes the second branch structures 13 and does not includes the first branch structures 12, the reference electrode 1 includes the second reference electrode 22 and does not includes the first reference electrode 21. The operation principle of the liquid crystal phase shifter having such a structure is substantially the same as that of the liquid crystal phase shifter having the above-described structure, and will not be described in detail.

Figure 4:
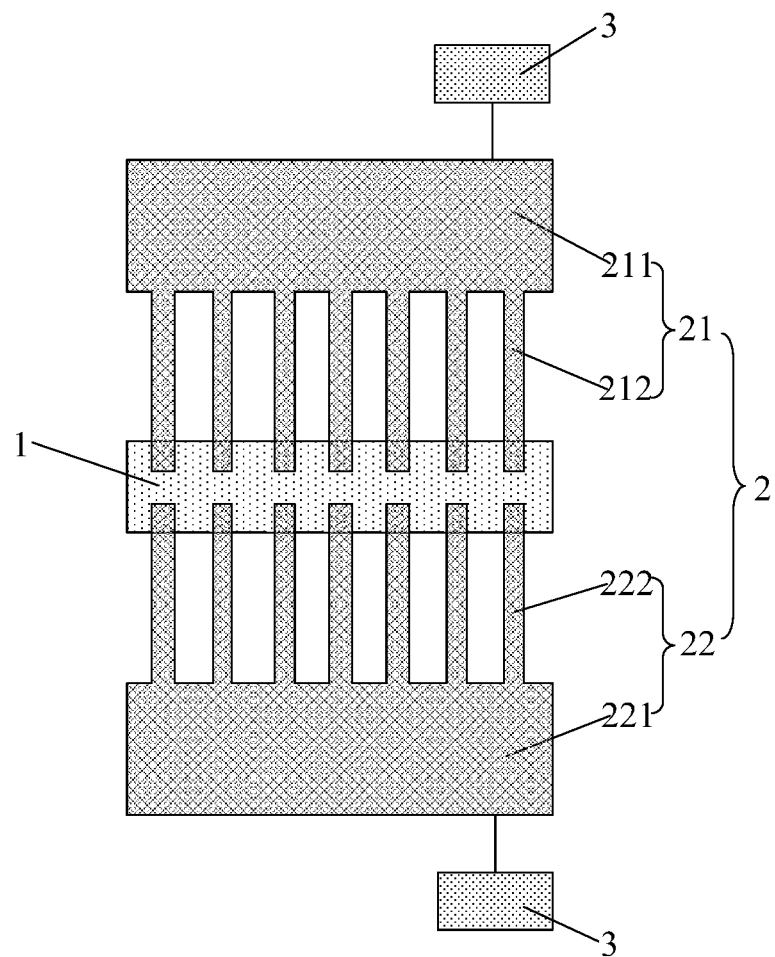
FIG. 4 is a top view of an implementation of a liquid crystal phase shifter according to an embodiment of the present disclosure.
Figure 5:
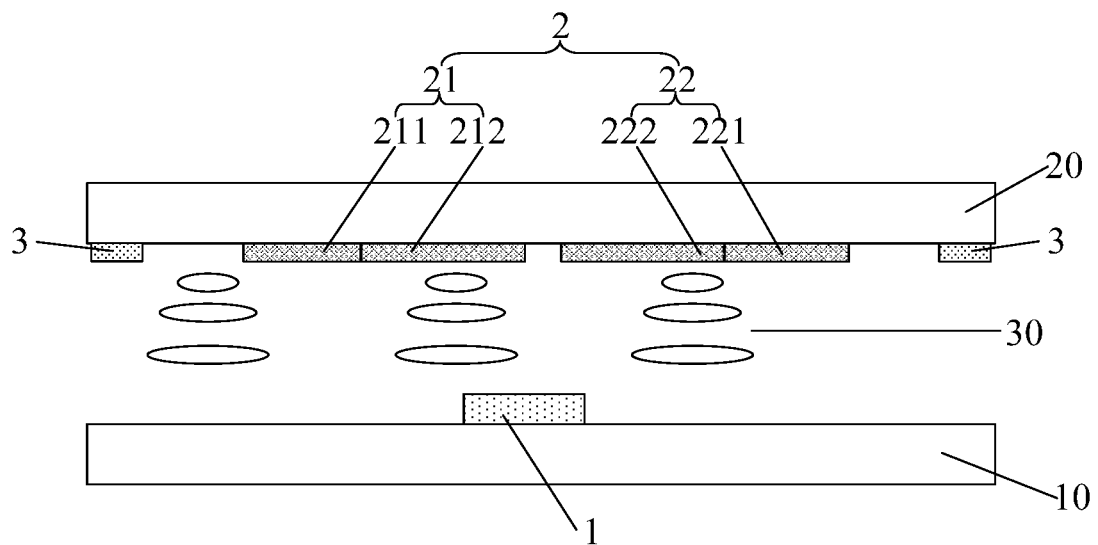
FIG. 5 is a cross-sectional view of the liquid crystal phase shifter shown in FIG. 4.

In some implementations, as shown in FIGS. 4 and 5, the liquid crystal phase shifter of the embodiment of the present disclosure includes a first substrate and a second substrate disposed opposite to each other, and a liquid crystal layer 30 (FIG. 5) disposed between the first substrate and the second substrate.

The first substrate may include a first base 10 (FIG. 5), and a signal electrode 1 disposed on a side of the first base 10 proximal to the liquid crystal layer 30.

The second substrate may include a substrate base 20 (FIG. 5), a reference electrode 2 and a reference voltage leading-in end 3 disposed on a side of the substrate base 20 proximal to the liquid crystal layer 30, the reference electrode 2 including a first reference electrode 21 and a second reference electrode 22, the first reference electrode 21 including a first body structure 211, and first branch structures 212 coupled to a side of the first body structure 211 proximal to the signal electrode 1, the second reference electrode 22 including a second body structure 221, and second branch structures 222 coupled to a side of the second body structure 221 proximal to the signal electrode 1, the first body structure 211 and the second body structure 221 both being coupled to the reference voltage leading-in end 3. It should be understood that it is also feasible to couple both the first branch structures 212 and the second branch structures 222 to the reference voltage leading-in end 3.

It should be noted that the first substrate is provided with a signal voltage leading-in end, which is coupled to the signal electrode 1 through a signal connection line for providing a signal voltage to the signal electrode 1, where the signal voltage is different from the reference voltage in voltage value.

In some implementations, an orthographic projection of the signal electrode 1 on the first base 10 is located between orthographic projections of the first body structure 211 of the first reference electrode 21 and the second body structure 221 of the second reference electrode 22 on the first base 10. Orthographic projections of the first branch structures 212 of the first reference electrode 21 and the second branch structures 222 of the second reference electrode 22 on the first base 10 are overlapped with the orthographic projection of the signal electrode 1 on the first base 10. Thus, when the microwave signal is input by the signal electrode 1, the dielectric constant of the liquid crystal layer 30 in the liquid crystal capacitor formed by the signal electrode 1 and the first branch structures 212 of the first reference electrode 21, the second branch structures 222 of the second reference electrode 22 can be changed by the voltages applied to the signal electrode 1 and the first branch structures 212 of the first reference electrode 21 and the second branch structures 222 of the second reference electrode 22, so as to change a phase of the microwave signal.

In some implementations, the first branch structures 212 of the first reference electrode 21 and the second branch structures 222 of the second reference electrode 22 may be both arranged periodically. For example, a distance between any two adjacent first branch structures 212 of the first reference electrode 21 may be the same, or may monotonically increase or decrease according to a certain rule; similarly, a distance between any two adjacent second branch structures 222 of the second reference electrode 22 may be the same, or may monotonically increase or decrease according to a certain rule. Thus, when a voltage is applied between the signal electrode 1 and the reference electrode 2 (the first reference electrode 21 and the second reference electrode 22), the dielectric constant of the liquid crystal layer 30 between the signal electrode 1 and the reference electrode 2 changes regularly, which facilitates a control of phase shift degree of the microwave signal input by the signal electrode 1. In some implementations, distances between adjacent first branch structures 212 may be different, and the first branch structures 212 may not be arranged according to a rule; overlapping areas between orthographic projections of the first branch structures 212 on the first base 10 and the orthographic projection of the signal electrode 21 on the first base 10 may be different; similarly, distances between adjacent second branch structures 222 may also be different, and the second branch structures 222 may not be arranged according to a rule; overlapping areas between orthographic projections of the second branch structures 222 on the first base 10 and the orthographic projection of the signal electrode 1 on the first base 10 may also be different.

Figure 6:
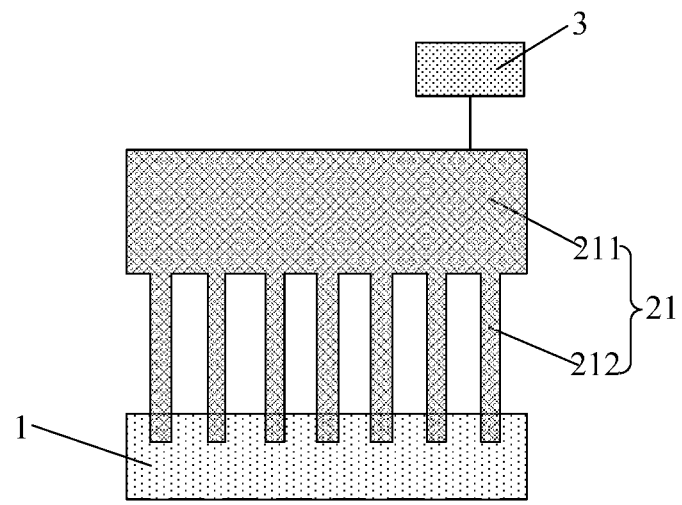
FIG. 6 is a top view of an implementation of a liquid crystal phase shifter according to an embodiment of the present disclosure.

Similar to the above structure, as shown in FIG. 6, in the liquid crystal phase shifter according to the embodiment of the present disclosure, the reference electrode 2 (FIG. 4) may include the first reference electrode 21 but do not include the second reference electrode 22, and the first reference electrode 21 may include the first body structure 211 and the first branch structures 212, and the operation principle of the liquid crystal phase shifter in such structure is substantially the same as that of the liquid crystal phase shifter described above, and will not be described in detail herein. It should be understood that the reference electrode 2 may also include the second reference electrode 22 (FIG. 4) but do not include the first reference electrode 21, and the second reference electrode 22 may include the second body structure 221 (FIG. 4) and the second branch structures 222 (FIG. 4), and the operation principle of the liquid crystal phase shifter in such structure is also substantially the same as that of the liquid crystal phase shifter described above, and will not be described in detail herein.

Figure 7:
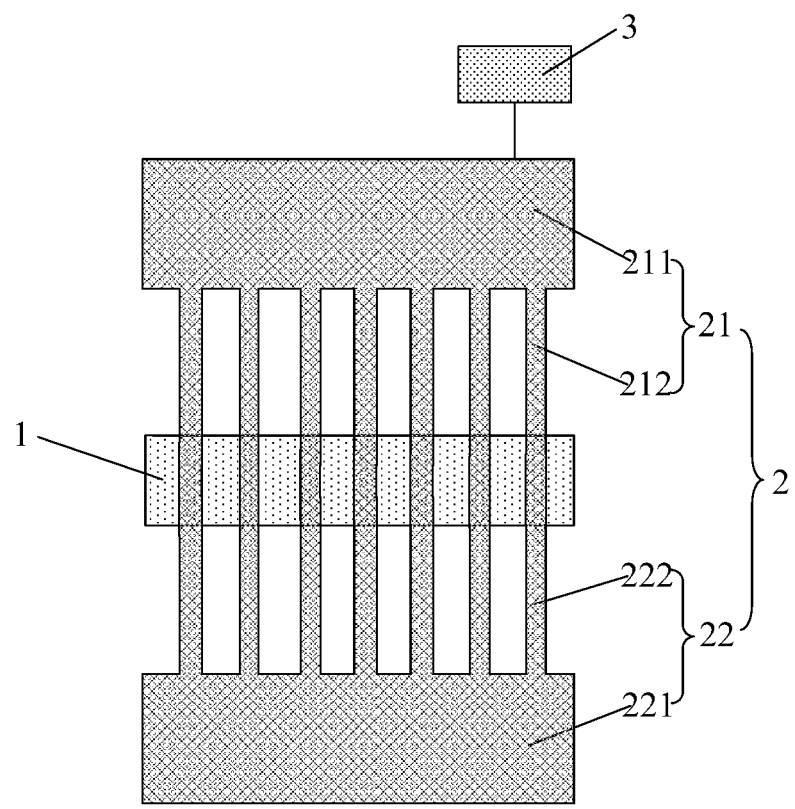
FIG. 7 is a top view of an implementation of a liquid crystal phase shifter according to an embodiment of the present disclosure.
Figure 8:
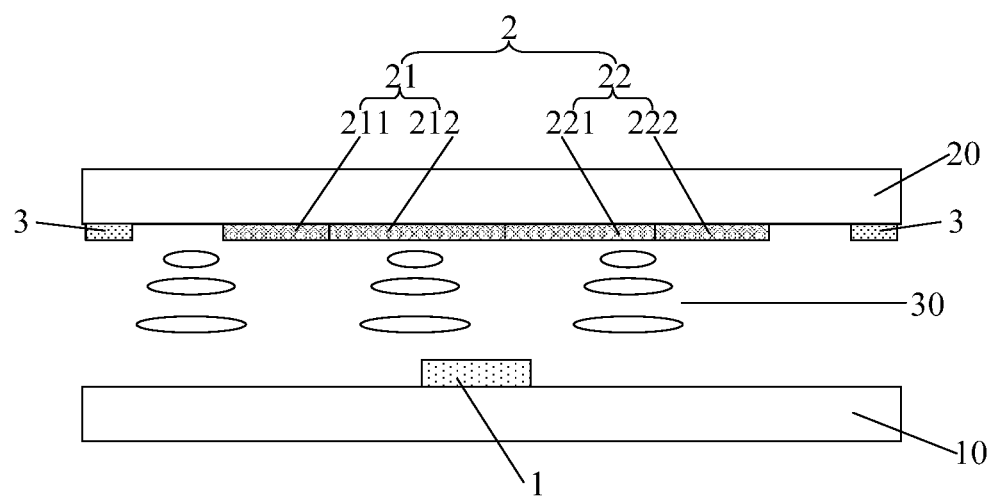
FIG. 8 is a cross-sectional view of the liquid crystal phase shifter shown in FIG. 7.

In some implementations, as shown in FIGS. 7 and 8, in the liquid crystal phase shifter according to the embodiment of the present disclosure, the first branch structures 212 of the first reference electrode 21 and the second branch structures 222 of the second reference electrode 22 may be disposed in a one-to-one correspondence, and the first branch structure 212 and the second branch structure 222 disposed in a correspondence may be formed into an integrally formed structure. In such a case, the reference voltage leading-in end 3 only needs to be coupled to one of the first body structure 211 and the second body structure 221. The liquid crystal phase shifter with such structure has the same operation principle as the liquid crystal phase shifter described above, and thus the description thereof is not repeated here.

Figure 9:
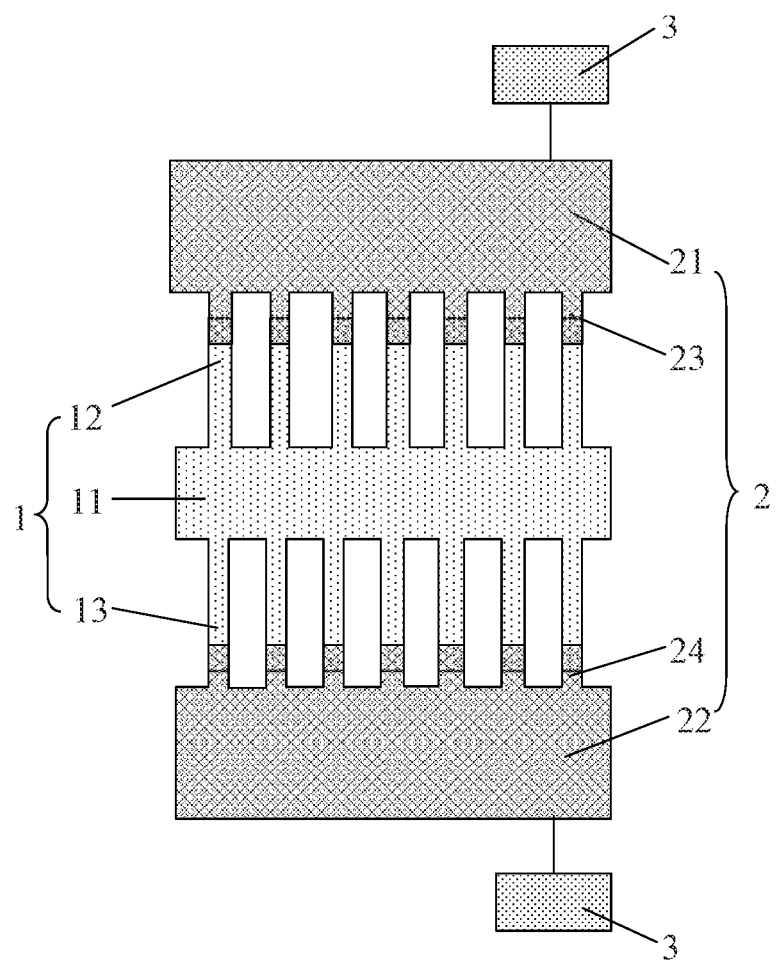
FIG. 9 is a top view of an implementation of a liquid crystal phase shifter according to an embodiment of the present disclosure.
Figure 10:
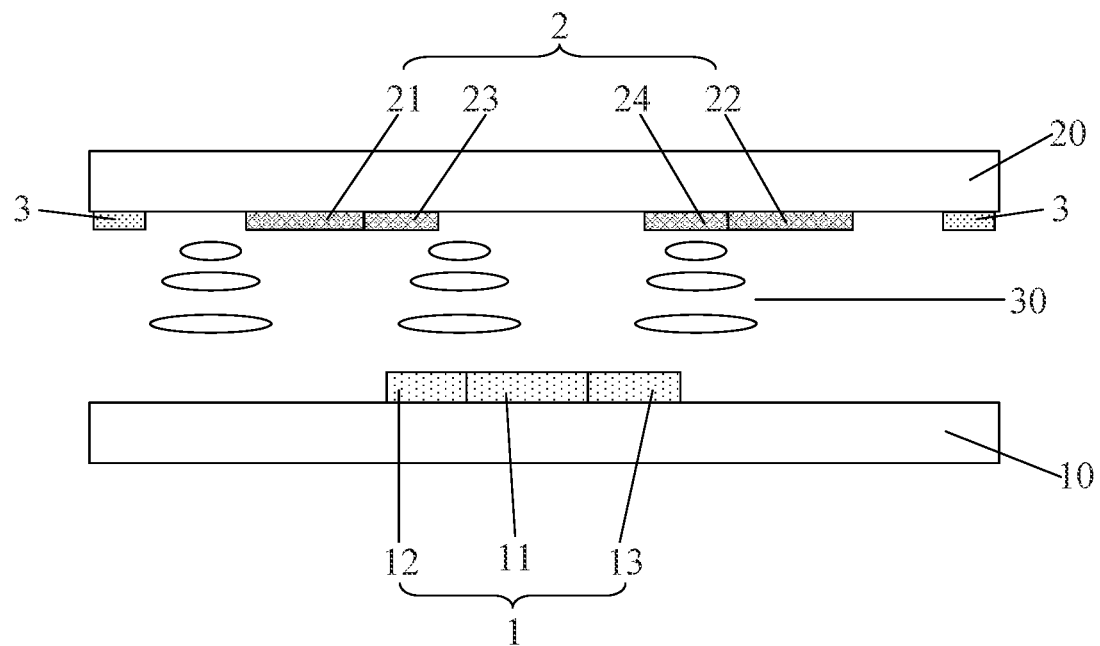
FIG. 10 is a cross-sectional view of the liquid crystal phase shifter shown in FIG. 9.

In some implementations, as shown in FIGS. 9 and 10, the liquid crystal phase shifter of the embodiment of the present disclosure includes a first substrate and a second substrate disposed opposite to each other, and a liquid crystal layer 30 disposed between the first substrate and the second substrate.

The first substrate may include a first base 10 (FIG. 10), a signal electrode 1 disposed on a side of the first base 10 proximal to the liquid crystal layer 30 (FIG. 10), the signal electrode 1 including a body structure 11 and branch structures, the branch structures including first branch structures 12 and second branch structures 13, the first branch structures 12 being coupled to a first side of the body structure 11; the second branch structures 13 being coupled to a second side of the body structure 11 opposite to the first side.

The second substrate may include a second base 20 (FIG. 10), a reference electrode 2 and a reference voltage leading-in end 3 disposed on the second base 20 proximal to the liquid crystal layer 30, the reference electrode 2 including a first reference electrode 21 and a second reference electrode 22 disposed at an interval, third branch structures 23 coupled to a side of the first reference electrode 21 proximal to the body structure 11 of the signal electrode 1, and fourth branch structures 24 coupled to a side of the second reference electrode 22 proximal to the body structure 11 of the signal electrode 1.

In some implementations, an orthographic projection of the body structure 11 of the signal electrode 1 on the first base 10 is located between orthographic projections of the first reference electrode 21 and the second reference electrode 22 on the first base 10, the first branch structures 12 are disposed in a one-to-one correspondence with the third branch structures 23, and orthographic projections of the first branch structure 12 and the third branch structure 23 at least partially overlap, and the second branch structures 13 are disposed in a one-to-one correspondence with the fourth branch structures 24, and orthographic projections of the second branch structure 13 and the fourth branch structure 24 at least partially overlap. The first reference electrode 21 and the second reference electrode 22 may be coupled to a same reference voltage leading-in end 3, or may be coupled to different reference voltage leading-in ends 3, it should be understood, whether the same reference voltage leading-in end 3 is coupled, or different reference voltage leading-in ends 3 are coupled, the reference voltage signals input by the first reference electrode 21 and the second reference electrode 22 are generally the same, and enables that, when a microwave signal is input by the signal electrode 1, a certain voltage difference exists between the signal electrode 1 and the reference electrode 2 (the first reference electrode 21 and the second reference electrode 22), so that the dielectric constants of the liquid crystal layer 30 in a liquid crystal capacitor formed by overlapping of the first branch structures 12 and the third branch structures 23 and in the liquid crystal capacitor formed by overlapping of the second branch structures 13 and the fourth branch structures 24 are changed, and a phase of the microwave signal is changed.

In some implementations, the first branch structures 12 and the second branch structures 13 of the signal electrode 1 may be arranged periodically, and similarly, the third branch structures 23 and the fourth branch structures 24 may be arranged periodically. For example, the first branch structures 12 and the second branch structures 13 may be symmetrically disposed about the body structure 11. A distance between any two adjacent first branch structures 12 may be the same, or may monotonically increase or decrease according to a certain rule; similarly, a distance between any two adjacent second branch structures 13 may be the same, or may monotonically increase or decrease according to a certain rule. Thus, when a voltage is applied between the signal electrode 1 and the reference electrode 2 (the first reference electrode 21 and the second reference electrode 22), the dielectric constant of the liquid crystal layer 30 between the signal electrode 1 and the reference electrode 2 changes regularly, which facilitates a control of phase shift degree of the microwave signal input by the signal electrode 1. In some implementations, distances between adjacent first branch structures 12 may be different, and the first branch structures 12 may not be arranged according to a rule; overlapping areas between orthographic projections of the first branch structures 12 on the first base 10 and orthographic projections of the third branch structures 23 on the first base 10 may be different; similarly, distances between adjacent second branch structures 12 may be different, and the second branch structures 12 may not be arranged according to a rule; overlapping areas between orthographic projections of the second branch structures 13 on the first base 10 and orthographic projections of the fourth branch structures 24 on the first base 10 may be different.

Figure 11:
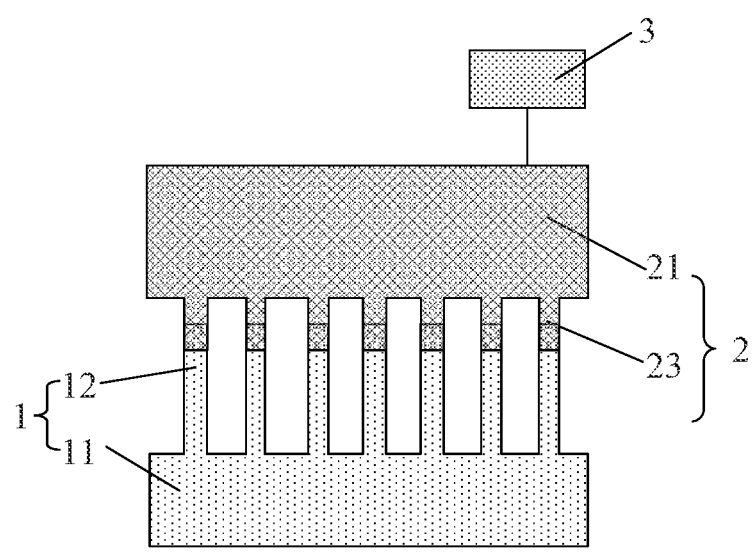
FIG. 11 is a top view of an implementation of a liquid crystal phase shifter according to an embodiment of the present disclosure.

Similar to the above structure, in the embodiment of the present disclosure, as shown in FIG. 11, the signal electrode 1 may include only one of the first branch structures 12 and the second branch structures 13 (not shown in FIG. 11), and the body structure 11; whereas when the signal electrode 1 includes the first branch structures 12 but does not include the second branch structures 13, the reference electrode 2 includes the first reference electrode 21 and the third branch structures 23 but does not include the second reference electrode 22 (not shown in FIG. 11) and the fourth branch structures 24 (not shown in FIG. 11). It should be understood that when the signal electrode 1 includes the second branch structures 13 but does not include the first branch structures 12, the reference electrode 2 includes the second reference electrode 22 and the fourth branch structures 24 but does not include the first reference electrode 21 and the third branch structures 23. Taking a case where the signal electrode 1 includes the body structure 11 and the first branch structures 12, and the reference electrode 2 includes the first reference electrode 21 and the third branch structures 23 as an example, the first branch structures 12 and the third branch structures 23 may be disposed in a one-to-one correspondence, and orthographic projections of the first branch structure 12 and the third branch structure 23 on the first base 10 (not shown in FIG. 11) at least partially overlap, and the reference voltage leading-in end 3 may be coupled to the first reference electrode 21 or the third branch structures 23. The operation principle of the liquid crystal phase shifter having such a structure is substantially the same as that of the above-described liquid crystal phase shifter, and will not be described in detail.

In the embodiment of the present disclosure, the signal voltage leading-in end 3 is disposed on the first base 10 and may be coupled to the signal electrode 1 through a signal connection line, and the signal connection line may be formed in the same layer as the signal voltage leading-in end 3 using the same material, or may be formed in the same layer as the signal electrode 1 using the same material; the reference voltage leading-in end 3 is disposed on the second base 20 and may be coupled to the reference electrode 2 through a signal connection line, and the signal connection line may be disposed in the same layer as the reference voltage leading-in end 3 using the same material, or may be formed in the same layer as the reference electrode 2 using the same material. Therefore, the structure of the phase shifter is lighter and thinner, the production cost of the phase shifter can be reduced, and the production efficiency is improved. The reference voltage leading-in end and the signal voltage leading-in end in the embodiment of the present disclosure are typically formed by using a metal material (e.g., copper), and the signal electrode 1 and the reference electrode 2 are typically formed by using a transparent conductive material (e.g., indium tin oxide).

In some implementations, the body structure and the branch structures coupled thereto in the embodiment of the present disclosure are integrally formed, so that the body structure and the branch structures coupled thereto can be simultaneously manufactured by a one-time manufacturing process, thereby reducing the manufacturing cost of the phase shifter and improving the production efficiency.

In some implementations, the reference voltage leading-in end in the embodiment of the present disclosure may specifically be a ground signal leading-in end, that is, a ground signal is used as a reference signal to provide a reference voltage. It should be understood, that any signal introduced by the reference voltage leading-in end can be used as the reference voltage, as long as a certain voltage difference can be made between the first electrode layer and the second electrode layer when the phase shifter is in operation, so that the first electrode layer and the second electrode layer form a current loop.

In some implementations, a material of the dielectric layer includes liquid crystal molecules, for example, the liquid crystal molecules in the dielectric layer may be positive liquid crystal molecules or negative liquid crystal molecules, and it should be noted that when the liquid crystal molecules are positive liquid crystal molecules, an included angle between a longitudinal axis direction of the liquid crystal molecules and the second electrode layer in the embodiment of the present disclosure should be less than or equal to 45°. When the liquid crystal molecules are negative liquid crystal molecules, the included angle between the longitudinal axis direction of the liquid crystal molecules and the second electrode layer is greater than or equal to 90°, so that the dielectric constant of the liquid crystal layer is changed after the liquid crystal molecules are deflected, and a phase shifting purpose is achieved.

Figure 12:
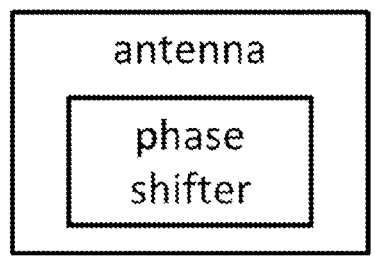
FIG. 12 is a schematic diagram of an antenna according to an embodiment of the present disclosure.

An embodiment of the present disclosure further provides an antenna, which includes the phase shifter described above as shown in FIG. 12, where, at least two patches are further disposed on a side of the second base away from the liquid crystal medium layer, and a gap between any two patches and a gap between electrode strips of an electrode layer are correspondingly disposed. Thus, the microwave signal phase-adjusted by the phase shifter can be radiated out from the gap between the patches.

It will be understood that the above embodiments are merely exemplary embodiments employed to illustrate the principles of the present disclosure, and the present disclosure is not limited thereto. It will be apparent to those skilled in the art that various changes and modifications can be made therein without departing from the spirit and scope of the present disclosure, and these changes and modifications are to be considered within the scope of the present disclosure.

The invention claimed is:

1. A phase shifter, comprising a first substrate and a second substrate disposed opposite to each other, and a dielectric layer between the first substrate and the second substrate,
    the first substrate comprises a first base and a first electrode layer arranged on a side of the first base proximal to the dielectric layer,
    the second substrate comprises a second base, and a second electrode layer and a reference voltage leading-in end arranged on a side, proximal to the dielectric layer, of the second base, the reference voltage leading-in end is coupled to the second electrode layer,
    one of the first electrode layer and the second electrode layer comprises a body structure, and branch structures coupled to the body structure,
    an orthographic projection of an end of each of the branch structures, of the one of the first electrode layer and the second electrode layer, away from the body structure on the first base is overlapped with an orthographic projection of the other one of the first electrode layer and the second electrode layer on the first base.

2. The phase shifter of claim 1, wherein the first electrode layer comprises the body structure and the branch structures, the branch structures comprising first branch structures coupled to a first side of the body structure and second branch structures coupled to a second side of the body structure opposite the first side,
    the second electrode layer comprises a first body structure and a second body structure which are arranged at an interval, the reference voltage leading-in end is coupled to the first body structure and the second body structure,
    an orthographic projection of the body structure of the first electrode layer on the first base is located between orthographic projections of the first body structure and the second body structure on the first base,
    the orthogonal projection of the first body structure on the first base overlaps with an orthogonal projection of an end of each of the first branch structures away from the body structure of the first electrode layer on the first base,
    the orthographic projection of the second body structure on the first base overlaps with an orthographic projection of an end of each of the second branch structures away from the body structure of the first electrode layer on the first base.

3. The phase shifter of claim 1, wherein the second electrode layer comprises the body structure and the branch structures, the body structure comprising a first body structure and a second body structure, and the branch structures comprising first branch structures and second branch structures, the first branch structures are coupled to a side of the first body structure proximal to the second body structure, the second branch structures are coupled to a side of the second body structure proximal to the first body structure, the reference voltage leading-in is coupled to the first body structure and the second body structure, an orthographic projection of the first electrode layer on the first base is located between orthographic projections of the first body structure and the second body structure on the first base;

the orthographic projection of the first electrode layer on the first base overlaps with an orthographic projection of an end of each of the first branch structures away from the first body structure on the first base and an orthographic projection of an end of each of the second branch structures away from the second body structure on the first base.

4. The phase shifter of claim 3, wherein the first branch structures and the second branch structures are disposed in one-to-one correspondence, and the first branch structure and the second branch structure disposed in a correspondence are formed into one piece.

5. The phase shifter of claim 1, wherein the second electrode layer comprises the body structure and the branch structures, the branch structures are coupled to a side of the body structure proximal to the first electrode layer, and an orthographic projection of an end of each of the branch structures proximal to the first electrode layer on the first base overlaps with an orthographic projection of the first electrode layer on the first base, and the reference voltage leading-in end is coupled to the body structure of the second electrode layer.

6. The phase shifter of claim 1, wherein the first electrode layer comprises the body structure and the branch structures, the branch structures comprising first branch structures coupled to a first side of the body structure and second branch structures coupled to a second side of the body structure opposite the first side, the second electrode layer comprises a first body structure and a second body structure which are arranged at an interval, third branch structures coupled to a side of the first body structure proximal to the second body structure, and fourth branch structures coupled to a side of the second body structure proximal to the first body structure, the reference voltage leading-in end is coupled to the first body structure and the second body structure, an orthographic projection of the body structure of the first electrode layer on the first base is located between orthographic projections of the first body structure and the second body structure on the first base, the first branch structures and the third branch structures are arranged in a one-to-one correspondence manner, and orthographic projections of the first branch structure and the third branch structure on the first base are at least partially overlapped, the second branch structures and the fourth branch structures are arranged in a one-to-one correspondence mode, and orthographic projections of the second branch structure and the fourth branch structure on the first base are at least partially overlapped.

7. The phase shifter of claim 1, wherein the first electrode layer comprises the body structure and the branch structures, the branch structures being coupled to a side of the body structure proximal to the second electrode layer, the second electrode layer comprises a body structure and branch structures coupled to a side of the body structure proximal to the first electrode layer, the branch structures of the first electrode layer and the branch structures of the second electrode layer are arranged in a one-to-one correspondence, and orthographic projections of the branch structure of the first electrode layer and the branch structure of the second electrode layer on the first base at least partially overlap, and the reference voltage leading-in end is coupled to the body structure of the second electrode layer.

8. The phase shifter of claim 1, wherein the reference voltage leading-in end comprises a ground signal leading-in end.

9. The phase shifter of claim 1, wherein the reference voltage leading-in end is coupled to the second electrode layer through a signal connection line, the signal connection line and the reference voltage leading-in end are formed by a same material and in a same layer, or the signal connection line and the second electrode layer are formed by a same material and in a same layer.

10. The phase shifter of claim 1, wherein the body structure and the branch structures of the one of the first electrode layer and the second electrode layer are formed into one piece.

11. The phase shifter of claim 1, wherein the branch structures located at a same side of the body structure of the one of the first electrode layer and the second electrode layer are arranged periodically.

12. The phase shifter of claim 1, wherein the dielectric layer comprises liquid crystal molecules.

13. An antenna, comprising the phase shifter of claim 1.

* * * * *